(12) United States Patent
Nagesh et al.

(10) Patent No.: US 12,314,119 B2
(45) Date of Patent: May 27, 2025

(54) DISTRIBUTED HARDWARE AND SOFTWARE COMPONENT MONITORING

(71) Applicant: Dell Products L.P., Round Rock, TX (US)

(72) Inventors: Pavan Nagesh, Bengaluru (IN); Shantanu Joshi, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 74 days.

(21) Appl. No.: 18/157,875

(22) Filed: Jan. 23, 2023

(65) Prior Publication Data

US 2024/0248778 A1    Jul. 25, 2024

(51) Int. Cl.
*G06F 11/00*    (2006.01)

(52) U.S. Cl.
CPC ...... *G06F 11/004* (2013.01); *G06F 2201/865* (2013.01)

(58) Field of Classification Search
CPC .............. G06F 11/004; G06F 2201/865
See application file for complete search history.

(56) References Cited

U.S. PATENT DOCUMENTS 9,397,905 B1 * 7/2016 Moniz .................. H04L 67/025

\* cited by examiner

*Primary Examiner* — Amine Riad
(74) *Attorney, Agent, or Firm* — DALY, CROWLEY, MOFFORD & DURKEE, LLP

(57) ABSTRACT

According to one aspect, a method includes: receiving, by a node of a computer cluster, a command for a health status report, the node having a plurality applications and being one of a plurality of nodes of the cluster, the command indicating a class of a health checks to be executed and a scope; identifying, from a configuration, one or more health checks to be executed based on the indicated class; executing the one or more health checks on one or more of the applications and on one or more of the nodes of the cluster according to the indicated scope, where different ones of the health checks are configured to determine state of different ones of the applications; aggregating, by the node, results of the executed health checks; and outputting the aggregated results.

15 Claims, 5 Drawing Sheets

DISTRIBUTED HARDWARE AND SOFTWARE COMPONENT MONITORING

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

Distributed storage systems, along with other types of distributed computing systems, may be hosted within cloud computing environments and/or an on-premises data centers. A distributed computing system can include various types of hardware and software components. Hardware components can include physical and/or virtual machines, storage devices, networking hardware, etc. Software components can include virtualization software, operating systems (OSs), services, middlewares, applications, etc. configured to run on and utilize physical/virtual hardware. A given application can run as conventional OS process or within a containerized environment (e.g., as a DOCKER container). In some cases, an application can run within a container, which itself can run within a virtual machine (VM).

A computer cluster (or simply "cluster") is type of distributed computing system in which multiple physical and/or virtual machines (or "nodes") are networked together and configured to execute common types of tasks. The multiple nodes can be controlled/scheduled to work together so that they can be viewed as a single system.

SUMMARY

According to one aspect of the disclosure, a method can include: receiving, by a node of a computer cluster, a command for a health status report, the node having a plurality of applications and being one of a plurality of nodes of the cluster, the command indicating a class of a health checks to be executed and a scope; identifying, from a configuration, one or more health checks to be executed based on the indicated class; executing the one or more health checks on one or more of the applications and on one or more of the nodes of the cluster according to the indicated scope, where different ones of the health checks are configured to determine state of different ones of the applications; aggregating, by the node, results of the executed health checks; and outputting the aggregated results.

In some embodiments, the one or more of the applications may include at least one containerized application and at least one non-containerized application. In some embodiments, the identifying of the one or more health checks to be executed based on the indicated class can include filtering out health check indicated as disabled in the configuration. In some embodiments, the executing of the one or more health checks on one or more of the applications and on one or more of the nodes of the cluster can include invoking, by the node that received the health status command, the one or more health checks on another node of the computer cluster. In some embodiments, the aggregating of the results of the executed health checks may include generating a plain-text report that indicates the determined states of different ones of the applications. In some embodiments, the method may further include sending the aggregated results to an analytics service external from the computer cluster.

According to one aspect of the disclosure, an apparatus includes a processor and a non-volatile memory storing computer program code. The computer program code, when executed on the processor, can cause the processor to execute any of the previously described method embodiments.

According to one aspect of the disclosure, a non-transitory machine-readable medium encodes instructions that, when executed by one or more processors, result in any of the previously described method embodiments.

It should be appreciated that individual elements of different embodiments described herein may be combined to form other embodiments not specifically set forth above. Various elements, which are described in the context of a single embodiment, may also be provided separately or in any suitable sub-combination. It should also be appreciated that other embodiments not specifically described herein are also within the scope of the following claims.

BRIEF DESCRIPTION OF THE DRAWINGS

The manner of making and using the disclosed subject matter may be appreciated by reference to the detailed description in connection with the drawings, in which like reference numerals identify like elements.

Figure 1:
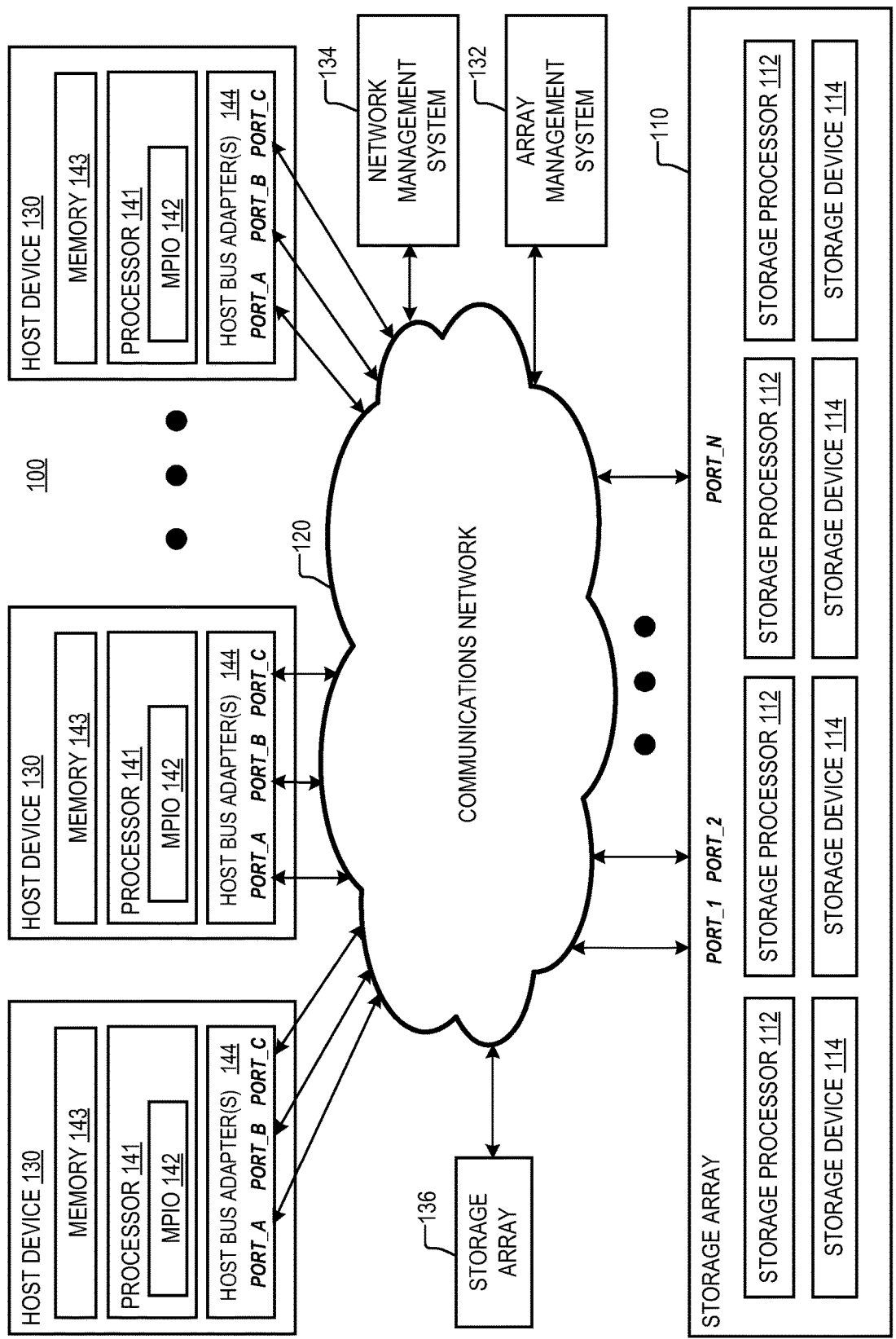
FIG. 1 is a block diagram of an illustrative storage system within which embodiments of the present disclosure may be utilized.

The drawings are not necessarily to scale, or inclusive of all elements of a system, emphasis instead generally being placed upon illustrating the concepts, structures, and techniques sought to be protected herein.

DETAILED DESCRIPTION

Within a distributed computing system, hardware and software components can fail for various reasons. For example, a storage device may become unusable as its free space approaches zero. As another example, a containerized application may encounter an unexpected condition and abort. To achieve a desired level of system availability and reliability, the health status of such components can be monitored periodically or on-demand. Component status/state can be reported to system administrators to aid with identifying, triaging, and recovering from various types of hardware and software failures.

Existing solutions for monitoring hardware/software components—such as OPENNMS and other network monitoring systems—are designed to collect not only health status information, but also track various performance-related metrics over time. As such, they may include a significant amount of code and generate a significant amount of data unrelated to component health status, resulting in relatively large, complex code bases and relatively high resource usage (e.g., processing, memory, and/or disk usage). Moreover, they typically implement a packet-based protocol, such as Simple Network Management Protocol (SNMP), wherein packets are divided into fixed-size segments and different types of data must be carefully aligned and encoded within particular segments. Because of this, developing scripts/tools to interface with such systems may be challenging and time consuming. Existing monitoring systems are generally designed to run on a centralized server separate from the hardware and software components being monitor. That is, they may not be cable of, or suitable for, running on individual nodes of a distributed system.

Disclosed herein are embodiments of structures and techniques for component health status monitoring that improve upon these and other aspects of existing systems. Disclosed embodiments provide a distributed component monitoring framework wherein a "lightweight" agent (e.g., in terms of code size and resource usage) is designed to run on individual nodes of a computer cluster or other distributed system. The agent is configured to execute one or more predefined health checks for hardware and software resources associated with the agent's node, collect health status information from agents running on other nodes, and optionally store component status information for historical analysis/reporting. The agent is capable of monitoring both containerized and non-containerized applications, along with various hardware infrastructure components that such applications rely on for normal operation. Disclosed embodiments provide the ability for a system administrator to enable and customize one or more predefined health checks via a text-based configuration file, without making code changes. For example, an administrator can enable/disable particular health checks, adjust threshold values and other parameters of specific health checks, and specify the interval at which different health checks run. Disclosed embodiments provide an application programming interface (API) and/or command-line interface (CLI) for running health checks and outputting health status reports. Such interfaces can include options for specifying scope of a health report (e.g., component-level, node-level, cluster-level, etc.), a particular health check or class of health checks to run, along with options for filtering and formatting the output. In some cases, an API may utilize a text-based format for requests and responses, such as Extensible Markup Language (XML), JavaScript Object Notation (JSON), or plain text.

FIG. 1 is a diagram of an example of a storage system 100 for which hardware and software component monitoring may be provided, according to aspects of the disclosure. As illustrated, the system 100 may include a storage array 110, a communications network 120, a plurality of host devices 130, an array management system 132, a network management system 134, and a storage array 136.

The storage array 110 may include a plurality of storage processors 112 and a plurality of storage devices 114. Each of the storage processors 112 may include a computing device that is configured to receive I/O requests from any of the host devices 130 and execute the received I/O requests by reading or writing data to the storage devices 114. In some implementations, each of the storage processors 112 may have an architecture that is the same or similar to the architecture of the computing device 400 of FIG. 4. The storage processors 112 may be located in the same geographic location or in different geographic locations. Similarly, the storage devices 114 may be located in the same geographic location or different geographic locations. Each of the storage devices 114 may include any of a solid-state drive (SSD), a non-volatile random-access memory (nvRAM) device, a non-volatile memory express (NVME) device, a hard disk (HD), and/or any other suitable type of storage device. In some implementations, the storage devices 114 may be arranged in one or more Redundant Array(s) of Independent Disks (RAID) arrays. The communications network 120 may include one or more of the Internet, a local area network (LAN), a wide area network (WAN), a fibre channel (FC) network, and/or any other suitable type of network.

Each of the host devices 130 may include a laptop, a desktop computer, a smartphone, a tablet, an Internet-of-Things device, and/or any other suitable type of electronic device that is configured to retrieve and store data in the storage arrays 110 and 136. Each host device 130 may include a memory 143, a processor 141, and one or more host bus adapters (HBAs) 144. The memory 143 may include any suitable type of volatile and/or non-volatile memory, such as a solid-state drive (SSD), a hard disk (HD), a random-access memory (RAM), a Synchronous Dynamic Random-Access Memory (SDRAM), etc. The processor 141 may include any suitable type of processing circuitry, such as a general-purpose process (e.g., an x86 processor, a MIPS processor, an ARM processor, etc.), a special-purpose processor, an application-specific integrated circuit (ASIC), a field programmable gate array (FPGA), etc. Each of the HBAs 144 may be a circuit board or integrated circuit adapter that connects a respective one of the host devices 130 to the storage array 110 (and/or storage array 136). In other words, each of the HBAs 144 may include a communications interface for connecting to the communications network 120, storage array 110 and/or storage array 136. Although in the example of FIG. 1 each of the host devices 130 is provided with at least one HBA 144, alternative implementations are possible in which the each of the host devices is provided with another type of communications interface, in addition to (or instead of) an HBA. The other type of communications interface may include one or more of an Ethernet adapter, an WiFi adapter, a local area network (LAN) adapter, etc.

Each processor 141 may be configured to execute a multi-path I/O (MPIO) driver 142. The MPIO driver 142 may comprise, for example, PowerPath™ drivers from Dell EMC™, and/or other types of MPIO drivers that are arranged to discover available communications paths any of the host devices 130 and the storage array 110. The MPIO driver 142 may be configured to select I/O operations from any of the I/O queues of the host devices 130. The sources of the I/O operations stored in the I/O queues may include respective processes of one or more applications executing on the host devices 130.

The HBA 144 of each of the host devices 130 may include one or more ports.

Specifically, in the example of FIG. 1, the HBA 144 of each of the host devices 130 includes three ports, which are herein enumerated as "port A", "port B", and "port C". Furthermore, the storage array 110 may also include a plurality of ports. In the example of FIG. 1, the ports in the storage array 110 are enumerated as "port 1", "port 2," and "port N", where N is a positive integer greater than 2. Each of the ports in the host devices 130 may be coupled to one of the ports of the storage array via a corresponding network path. The corresponding network path may include one or more hops in the communications network 120. Under the nomenclature of the present disclosure, a network path spanning between an HBA port of one of host devices 130 and one of the ports of the storage array 110 is referred to as a "network path of that host device 130".

Figure 4:
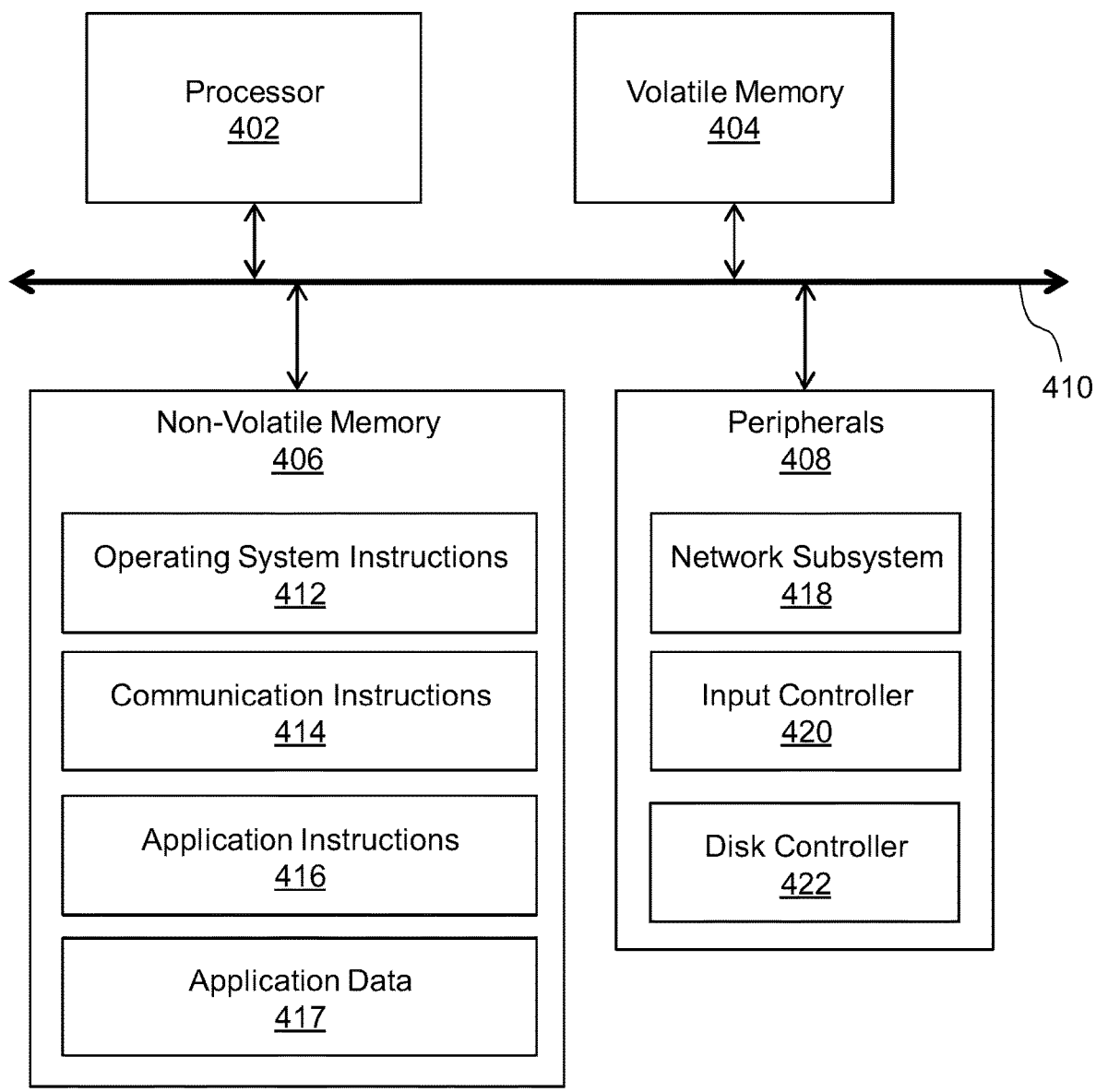
FIG. 4 is block diagram of a processing device on which methods and processes disclosed herein can be implemented, according to some embodiments of the disclosure.

Array management system 132 may include a computing device, such as the computing device 400 of FIG. 4. The array management system 132 may be used by a system administrator to re-configure the storage array 110, e.g., when degraded performance of the storage array 110 is detected.

Network management system 134 may include a computing device, such as the computing device 400 of FIG. 4. The network management system 134 may be used by a network administrator to configure the communications network 120 when degraded performance of the communications network 120 is detected.

The storage array 136 may be the same or similar to the storage array 110. The storage array 136 may be configured to store the same data as the storage array 110. The storage array 136 may be configured to operate in either active-active configuration with the storage array 110 or in active-passive configuration. When storage arrays 110 and 136 operate in active-active configuration, a write request to either of storage arrays 110 and 136 is not acknowledged back to the sender until the data associated with the write request is written to both of the storage arrays 110 and 136. When storage arrays 110 and 136 are operated in active-passive configuration, a write request to a given one of the storage arrays 110 and 136 is acknowledge for as long the data associated with write request is written to the given one of the storage arrays 110 and 136 before the writing to the other one of the storage arrays is completed.

While embodiments of the present disclosure are described in terms of storage systems, the structures and techniques disclosed herein may be generally applied to any distributed computing systems.

Figure 2:
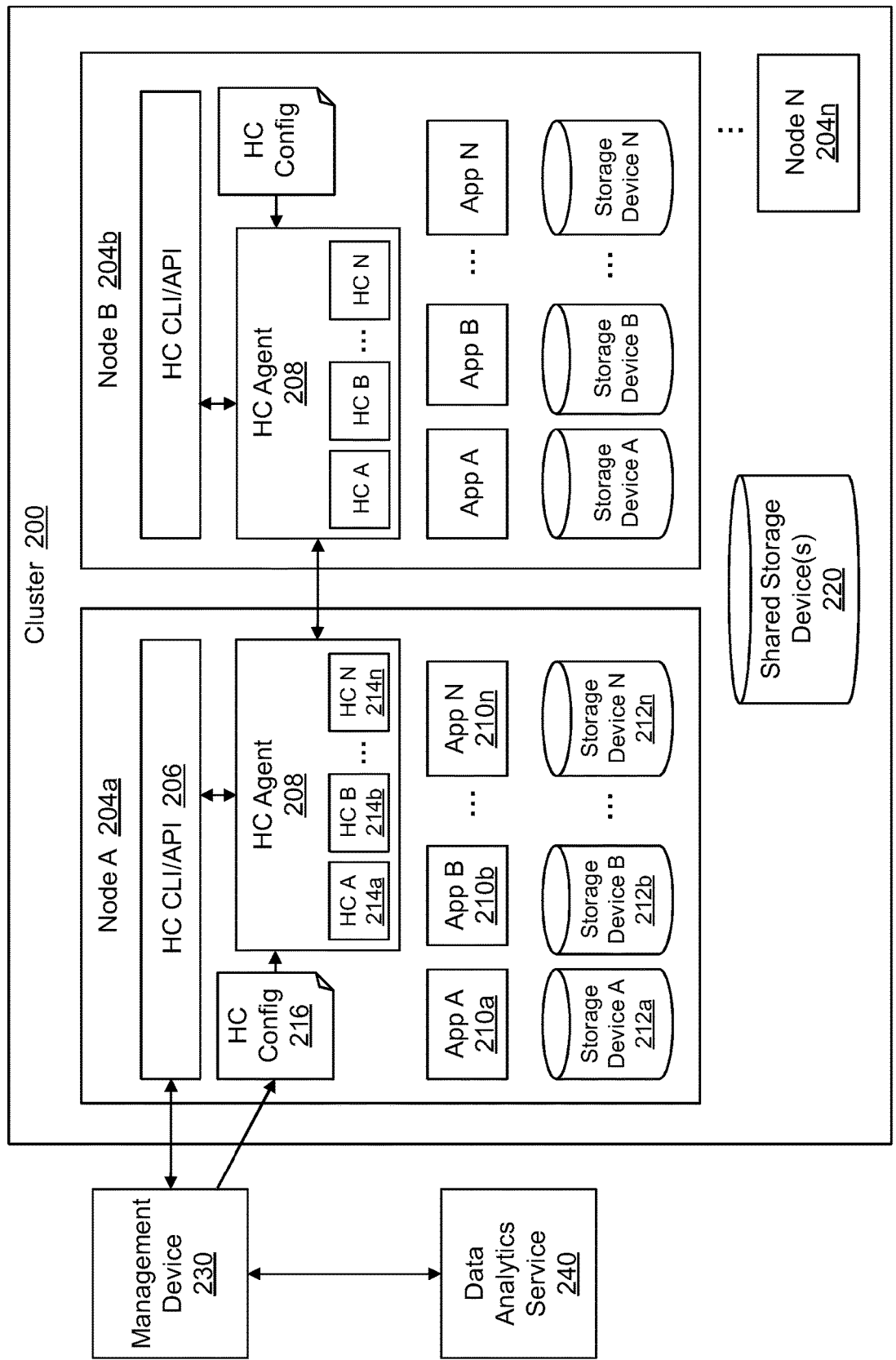
FIG. 2 is a block diagram of a computer cluster with distributed component monitoring, according to embodiments of the present disclosure.

FIG. 2 shows a computer cluster with distributed hardware and software component monitoring, according to embodiments of the present disclosure. An illustrative cluster 200 includes a plurality of nodes 204a, 204b, . . . , 204n (204 generally) that may be configured to communicate with each other over a communications network (not shown). The communications network may be the same as or similar to network 120 of FIG. 1. A given node 204 may correspond to a storage processor 112 and one or more storage devices 114 of FIG. 1.

An illustrative node 204a includes a health check interface 206, a health check agent 208, one or more applications 210a, 210b, . . . , 210n (210 generally), and one or more storage devices 212a, 212b, . . . , 212n (212 generally) in addition to various other hardware and/or software components which are not shown to promote of clarity. For example, nodes 204 can include particular arrangements of compute, storage, and network components including but not limited to arrangements illustrated in FIG. 1 and/or FIG. 4. In some cases, multiple different nodes 204 of the cluster 200 may have substantially identical components. For example, as shown in FIG. 2, node 204a and 204b may have substantially identical hardware and software components. In some cases, different nodes 204 may have different components.

In some embodiments, one or more nodes 204 may be implemented at least in part utilizing virtual resources such as virtual machines (VMs) or Linux containers (LXCs), or combinations of both as in an arrangement in which DOCKER containers or other types of LXCs are configured to run on VMs.

Applications 210 can include containerized applications, non-containerized applications, or a combination thereof. Nodes can be configured to execute various types of applications, including but not limited to storage-related applications. As one example, nodes 204 may be configured to run a storage management application such as UNISPHERE. Storage devices 212 may be the same or similar to embodiments of storage devices 114 described above in the context of FIG. 1. Applications 210 and storage devices 212 are examples of software and hardware components, respectively, that may be monitored according to embodiments of the present disclosure.

Health check interface 206 can include a CLI and/or an API that provides commands and associated options for executing health checks and outputting health status reports. Health check interface 206 can receive commands and options from a user (e.g., a system administrator with command-line access to node 204a) or from an external processing device (e.g., management device 230 with network access to cluster 200), and interface with health check agent 208 to execute said commands and generate said reports. Health checks can be performed at the level of a component, a node, a cluster, or even multiple clusters, and this report scope can be specified as a CLI/API option. Other options can include an identifier (e.g., name) of a particular health check or class of health checks to run, along with options for filtering and formatting the output. In some embodiments, health check interface 206 may provide an API with a text-based format for requests and responses, such as XML, JSON, or plain text. In some embodiments, health check interface 206 may output health status reports in a text-based format. In some embodiments, health check interface 206 may include an option for specifying which output format is used for health status reports.

Following are examples of XML-based health status reports that can be generated and output by interface 206, where the scope of the health report includes two nodes ("NODE-1" and "NODE-2"), three software components ("APPLICATION-1," "APPLICATION-2," and "APPLICATION-3"), and one or more infrastructure hardware components ("NODE HEALTH").

In Example 1, a status code of zero (0) is returned for all components covered by the report, indicating that all these components are functioning normally (i.e., that they are in a normal/expected state).

Health Status Report Example 1

```
<?xml version="1.0" ?>
<HealthCheck>
   <Component>
      <desc>covers application health on nodes where app instances are running</desc>
      <name>APPLICATION-1</name>
      <host>['NODE-1', 'NODE-2']</host>
      <status>0</status>
      <description> </description>
   </Component>
   <Component>
      <desc>covers application health on nodes where app instances are running</desc>
      <name>APPLICATION-2</name>
      <host>['NODE-1']</host>
      <status>0</status>
      <description> </description>
   </Component>
   <Component>
      <desc>covers application health on nodes where app instances are running</desc>
      <name>APPLICATION-3</name>
      <host>['NODE-1']</host>
      <status>0</status>
      <description> </description>
   </Component>
```

-continued

Health Status Report Example 1

```
<Component>
    <desc> covers infrastructure components or entities on given
node</desc>
    <name>NODE HEALTH</name>
    <host>['NODE-1']</host>
    <status>0</status>
    <description> </description>
</Component>
<Component>
    <desc> covers infrastructure components or entities on given
node</desc>
    <name>NODE HEALTH</name>
    <host>['NODE-2']</host>
    <status>0</status>
    <description> </description>
</Component>
</HealthCheck>
```

In Example 2, a status code of one (1) is returned for APPLICATION-2 and a status code of two (2) is returned for NODE HEALTH, indicating with these components are in unexpected/failed states. As shown, the generated health status report can also provide a detailed description of the failures (e.g., "application instance APPINS is failing" and "root partition disk utilization above threshold") to help facilitate triage and recovery.

Health Status Report Example 2

```
<?xml version="1.0" ?>
<HealthCheck>
    <Component>
        <desc>covers application health on nodes where app instances are
running</desc>
        <name>APPLICATION-1</name>
        <host>['NODE-1', 'NODE-2']</host>
        <status>0</status>
        <description> </description>
    </Component>
    <Component>
        <desc>covers application health on nodes where app instances are
running</desc>
        <name>APPLICATION-2</name>
        <host> </host>
        <status>1</status>
        <description>application instance APPINS is failing</description>
    </Component>
    <Component>
        <desc> covers infrastructure components or entities on given
node</desc>
        <name>NODE HEALTH</name>
        <host>['NODE-1']</host>
        <status>2</status>
        <description>Root partition disk utilization above
threshold</description>
    </Component>
    <Component>
        <desc> covers infrastructure components or entities on given
node</desc>
        <name> NODE HEALTH </name>
        <host>['NODE-2']</host>
        <status>0</status>
        <description> </description>
    </Component>
</HealthCheck>
```

A given instance of health check agent 208 is configured to execute one or more health checks to determine the status of hardware and software components associate with the node on which it is installed (e.g., node 204a). This may be done responsive to CLI/API commands received by interface 206.

As shown, health check agent 208 may include or otherwise have access to a plurality of predefined health checks 214a, 214b, . . . , 214n (214 generally) which may be identified with unique names, paths, or other unique identifiers. In some embodiments, separate health checks 214 may be defined within separate files stored on the node 204a or otherwise accessible by agent 208. In some cases, health checks 214 may be stored on a shared storage device 220 of the cluster, accessible by multiple different nodes 204, such that only a single copy of a given health check need to be maintained.

In some cases, health checks 214 may be implemented as scripts or other type of executable files. Different health check scripts may be designed to return health status information in a manner consistent with each other. For example, each health script may be designed to return a numeric status code and optional description string, where status code of zero indicates that the component is a normal state (i.e. is "healthy") and a non-zero status code indicates that the component is an unexpected or failed state (i.e. is "unhealthy").

In response to a CLI/API command, health check agent 208 can identify one or more health checks 214 to run, determine paths to the scripts that implement those health checks, and then execute those scripts and capture their returned status codes and optional descriptions for reporting. In some cases, health check agent 208 may execute multiple health checks 214 in parallel to reduce the time required to generate a health status report. In other cases, it can run health checks 214 serially to reduce resource consumption.

A health check 214 can perform one or more steps to determine whether a given hardware/software component (or set of components) is in a normal state or an unexpected state. In some cases, a health check 214 for a particular application can include several different sub-checks/tests to determine if that application is experiencing a failure condition. Health checks 214 can be application-specific and can customized according to requirements of different applications. In some cases, health checks 214 can be designed to determine the state of a containerized applications using an interface provided by a container hosting engine such as DOCKER or container orchestrator frameworks such as KUBERNETES. In some health checks 214 can utilize system calls to determine if one or more node hardware components are their normal state. For example, a health check 214 may invoke system calls to determine the current CPU, memory, and/or utilization on the node, and compare these determined values to threshold values to determine if the node is under unusually heavy load.

Health check agent 208 can run on multiple different nodes 204 of the cluster and, in some cases, on every node 204. The different instances of health check agent 208 may communicate with each to generate multi-node health status reports. For example, as shown in FIG. 2, health check agent 208 on node 204a may receive a CLI/API command to generate a health status report for components of both node 204a and node 204b (i.e., the scope of the report may include both of these nodes). In response, the agent 208 on node 204a may execute one or more health checks locally and also invoke a remote procedure call (RPC) for the agent 208 on node 204b to execute one or more its health checks. The agent 208 on first node 204a may capture/collect the health status information returned by both the locally-run health checks and the remotely-run health checks, and aggregate this information into a single health status report. While only two nodes 204a, 204a have been described in this example, the structures and techniques described herein can be applied to aggregate health status information across arbitrary numbers of nodes. In some cases, multiple nodes 204 can run health checks in parallel with each other. For example, the receiving node may issue parallel RPC calls on multiple other nodes.

The agent 208 on the node that receives a command for a health status report (e.g., node 204*a*) can determine which nodes of the cluster 200 should be included in the report and thus which needs need to execute health checks. As previously mentioned, the CLI/API may include options for specifying the scope of the health check report to be run. In some embodiments, these options can specify the scope as one of: component-level, node-level, cluster-level, or multi-cluster-level. In the case of component-level, the health status report may be limited to a single component (e.g., application) identified by the options associated with on one or more nodes also identified by the options (or, as a default, only on the receiving node). In the case of node-level, the health status report will cover all components of a single node identified by the options (or, as a default, the receiving node). In the case of cluster-level, the health status report will cover one or more components identified by the options (or, as a default, all components) across all nodes of the cluster. An agent 208 can obtain information (e.g., IP addresses) about the nodes into the cluster using any known technique. In the case of multi-cluster-level, health status information from across multiple clusters can be consolidated into a single report. In this situation, a list of clusters to be considered can be provided within a configuration file and access to other cluster nodes would be explicitly granted within the underlying infrastructure(s).

Health check agent 208 may utilize a configuration file 216 to determine when and how to run health checks in a given situation. In some cases, a common configuration file 216 may be used across different nodes 204 of a cluster. For example, configuration file 216 may be stored on a shared storage device 220 (e.g., by management device 230) and accessed by multiple different nodes 204. In other cases, different configuration files 216 may be deployed to different nodes. Configuration file 216 may have a text format, such as XML, JSON, or plain text.

Configuration file 216 can define a list of available, predefined health checks along with parameters that control when and how each of the health check executes. Health checks may be uniquely identified by name within configuration file 216. For a given health check, configuration file 216 can specify its unique name, a boolean value indicating whether the health check is enabled, an optional list of parameters that are passed to the health check script, and an optional value indicating how often the health check should run. The optional list of parameters (e.g., threshold values, device names, etc.) can be used to override/customize default behavior of a given predefined health check, without requiring any code changes. The ability to enable and disable individual health checks via configuration file 216 makes it easy to adapt monitoring as new applications or other components are added or removed from the cluster 200 of particular nodes thereof.

In some embodiments, configuration file 216 can identify classes (i.e., collections) health checks that are useful to run together in particular circumstances. For example, before performing an upgrade a node/cluster, it may be useful to run a set health checks that provide information about readiness of a node/cluster for upgrade and detect any issues that may prevent a successful. These health checks can be defined as a class within configuration file 216, and the class can be assigned a unique name ("preUpgrade"). Subsequently, the class name can be specified as an option to the CLI/API command for generating a health status report and, in response, agent 208 can execute the corresponding set of health checks defined in configuration file 216. In some cases, a default class of health checks may be defined in configuration file 216, and this can be used when no class (or individual health check) is specified in the CLI/API options.

These and other features of configuration file 216 are illustrated by the following example.

---

Configuration File Example

```
{
  "schemaVersion" : "1.0",
  "releaseVersion": "10.0.0.961",
  "releaseDate": null,
  "checkDefinitionPath" : "/path/where/checks/are/defined",
  "dataRetentionPeriodInDB" : {
        "period" : "",
        "unit" : ""
    }
/*
  Checks to be performed for a given class
*/
  "checkClasses" : {
      "preUpgrade" : [ "rootDeviceCheck", "bootDeviceCheck",
"deviceCheck", "configuredNodesCheck", "appDiskUtilizationCheck",
"infraDiskUtilizationCheck", "infraCpuUtilizationCheck",
"appCpuUtilizationCheck","operationStatusCheck" ],
      "postUpgrade" : [ "rootDeviceCheck", "bootDeviceCheck",
"deviceCheck", "configuredNodesCheck"],
      "postInstall" : [ "rootDeviceCheck", "bootDeviceCheck",
"deviceCheck", "configuredNodesCheck"],
      "default" : [ "rootDeviceCheck", "bootDeviceCheck",
"deviceCheck", "configuredNodesCheck", "appDiskUtilizationCheck",
"infraDiskUtilizationCheck", "infraCpuUtilizationCheck",
"appCpuUtilizationCheck","operationStatusCheck" ]
  }
/*
  List of predefined health checks
*/
  "healthChecks" : [
    {
      "checkName" : "rootDeviceCheck",
      "checkParamList": [ ],
      "checkIntervalInMinutes" : "60",
      "checkEnable" : "true"
    },
    {
      "checkName" : "bootDeviceCheck",
      "checkParamList": [ ],
      "checkIntervalInMinutes" : "60",
      "checkEnable" : "true"
    },
    {
      "checkName" : "deviceCheck",
      "checkParamList": [ { "deviceName" : "/device/name" } ],
      "checkIntervalInMinutes" : "60",
      "checkEnable" : "true"
    },
    {
      "checkName" : "configuredNodesCheck",
      "checkParamList": [ { "nodeList" : ["node1", "node2"] } ],
      "checkIntervalInMinutes" : "60",
      "checkEnable" : "true"
    },
    {
      "checkName" : "infraDiskUtilizationCheck",
      "checkParamList": [ {
            "disk1" : { "diskThreshold" : "val1" },
            "disk2" : { "diskThreshold" : "val2" },
            "disk3" : { "diskThreshold" : "val3" },
            "disk4" : { "diskThreshold" : "val4" },
          }
      ],
      "checkIntervalInMinutes" : "60",
      "checkEnable" : "true"
    },
    {
```

-continued

Configuration File Example

```
        "checkName" : "appDiskUtilizationCheck",
        "checkParamList": [ {
                "app1" : { "appDiskThreshold" : "val1" },
                "app2" : { "appDiskThreshold" : "val2" },
                "app2" : { "appDiskThreshold" : "val3" },
            }
        ],
        "checkIntervalInMinutes" : "60",
        "checkEnable" : "true"
    },
    {
        "checkName" : "infraCpuUtilizationCheck",
        "checkParamList": [ { "cpuTheshold" : "val1"} ],
        "checkIntervalInMinutes" : "60",
        "checkEnable" : "true"
    },
    {
        "checkName" : "appCpuUtilizationCheck",
        "checkParamList": [ {
                "app1" : { "appCpuThreshold" : "val1" } ,
                "app2" : { "appCpuThreshold" : "val2" },
                "app2" : { "appCpuThreshold" : "val2" },
            }
        ],
        "checkIntervalInMinutes" : "60",
        "checkEnable" : "true"
    },
    {
        "checkName" : "operationStatusCheck",
        "checkParamList": [ ],
        "checkIntervalInMinutes" : "60",
        "checkEnable" : "true"
    }
  ]
}
```

As illustrated with the above example, configuration file 216 can include version control information ("schemaVersion," "release Version," "releaseDate") along with a path indicating where the health check scripts/files are stored on disk ("checkDefinitionPath"). This path, along with the unique name or other identifier of a particular health check, can be used to locate that health check's script for execution. In some cases, configuration file 216 can also include a data retention policy ("dataRetentionPeriodInDB") which is used by health check agent 208, as discussed below.

In the above example, nine health checks ("healthChecks") are defined: "rootDeviceCheck," "bootDeviceCheck," "deviceCheck," "configuredNodesCheck," "infraDiskUtilizationCheck," "appDiskUtilizationCheck," "infraCpuUtilizationCheck," "appCpuUtilizationCheck," and "operationStatusCheck." All of the health checks are shown as enabled ("checkEnable") and set to run every 60 minutes ("checkIntervalInMinutes"). Optional parameters are defined for several of the health checks ("checkParamList"). Also in this example, three health check classes ("checkClasses") are defined: "preUpgrade," "postUpgrade," "postInstall," and "default." These specific health checks and classes are merely illustrative and not intended to be limiting.

It will now be appreciated that the per-node health check agents 208 and interfaces 206 collectively form a distributed component monitoring framework. Advantageously, no separate, centralized server is required to perform component monitoring across multiple different nodes or across the entire cluster. Instead, each node 204 is capable of generating health status reports for the entire cluster or a subset thereof. Health status reports can be generated on-demand using either the provided CLI or text-based API, allowing for easy access by system administrators and simply integration with external devices/systems. The distributed component monitoring framework provides a unified way to monitor both containerized and non-containerized applications, along with core infrastructure components.

In some embodiments, health check agent 208 may be configured to store historical health status information to a database (not shown). In some embodiments, health check agent 208 may periodically execute one or more health checks 214 (e.g., the default class of health checks defined by configuration file 216) and store the results to the database, providing a record of component state over time. Health check agent 208 may determine when to run particular health checks using, for example, the "checkIntervalInMinutes" configuration option illustrated in the above example. Health check agent 208 may store data according to a configurable data retention policy defined in configuration file 216 (e.g., "dataRetentionPeriodInDB" in the example above).

In some embodiments, health status information generated by an agent 208 can be sent (e.g., pushed) to a service that provides data analysis, monitoring, and/or visualization capabilities. For example, management device 230 may receive health status information generate by one or more nodes 204, and can send that information to a data analytics service 240 that is external to the cluster 200. In some embodiments, data analytics service 240 may correspond to a software-as-a-service (SaaS) platform. In some embodiments, analytics service 240 may correspond to SPLUNK, GRAFANA, CLOUDIQ, or similar tools/services.

Figure 2A:
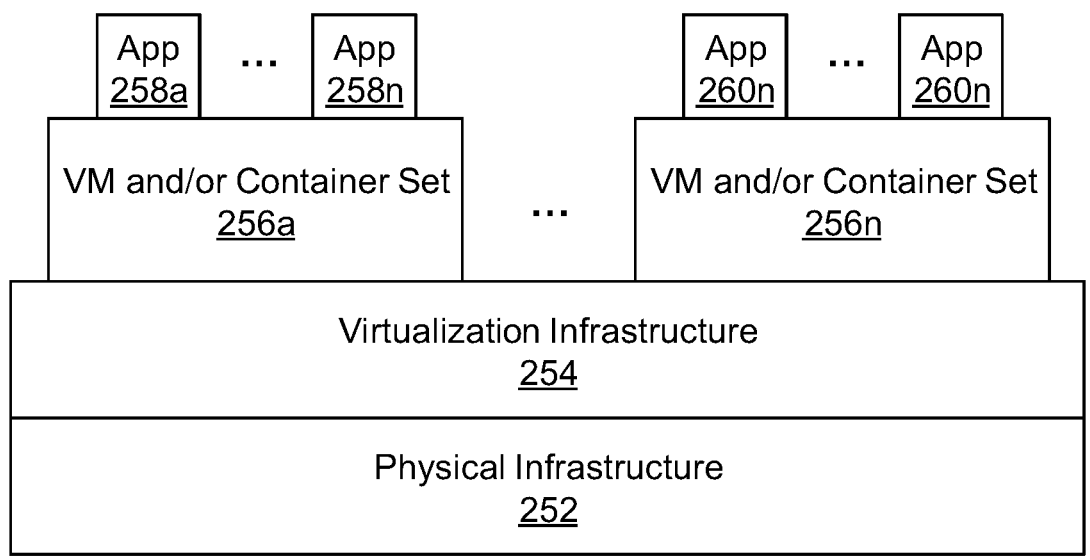
FIG. 2A is a block diagram of infrastructure upon which monitored hardware and software components can be implemented, according to the embodiments of the disclosure.

FIG. 2A shows an example of infrastructure 250 upon which monitored hardware and software components (including containerized and/or non-containerized applications) can be implemented, according to the embodiments of the disclosure. For example, infrastructure 250 comprises a combination of physical and virtual processing resources that may be utilized to implement at least a portion one or more cluster nodes 204 shown in FIG. 2.

Infrastructure 250 comprises multiple virtual machines (VMs) and/or container sets 256a, ..., 256n (256 generally) implemented using virtualization infrastructure 254. The virtualization infrastructure 254 runs on physical infrastructure 252, and illustratively comprises one or more hypervisors and/or operating system level virtualization infrastructure. In some embodiments, the operating system level virtualization infrastructure illustratively can include kernel control groups of a Linux operating system or other type of operating system.

Infrastructure 250 further comprises sets of applications running on respective ones of the VMs/container sets 256 under the control of the virtualization infrastructure 254. For example, as shown, applications 258a, ..., 258n may run on VMs/container sets 256a and applications 260a, ..., 260n may run on VMs/container sets 256n. The VMs/container sets 256 may comprise respective VMs, respective sets of one or more containers (e.g., DOCKER or LXC containers), or respective sets of one or more containers running in VMs.

In some implementations, the VMs/container sets 256 comprise respective VMs implemented using virtualization infrastructure 254 that comprises at least one hypervisor. A hypervisor platform may be used to implement a hypervisor within the virtualization infrastructure 254, where the hypervisor platform has an associated virtual infrastructure management system. The underlying physical machines may comprise one or more distributed processing platforms that include one or more storage systems.

In other implementations, the VMs/container sets 256 comprise respective containers implemented using virtualization infrastructure 254 that provides operating system level virtualization functionality, such as support for DOCKER containers running on bare metal hosts, or DOCKER containers running on VMs. The containers are illustratively implemented using respective kernel control groups of the operating system.

As is apparent from the above, one or more of components of cluster 200 (FIG. 2) may each run on a computer, server, storage device or other processing platform element. A given such element may be viewed as an example of what is more generally referred to herein as a processing device. The illustrative infrastructure 250 may represent at least a portion of one processing platform.

Figure 3:
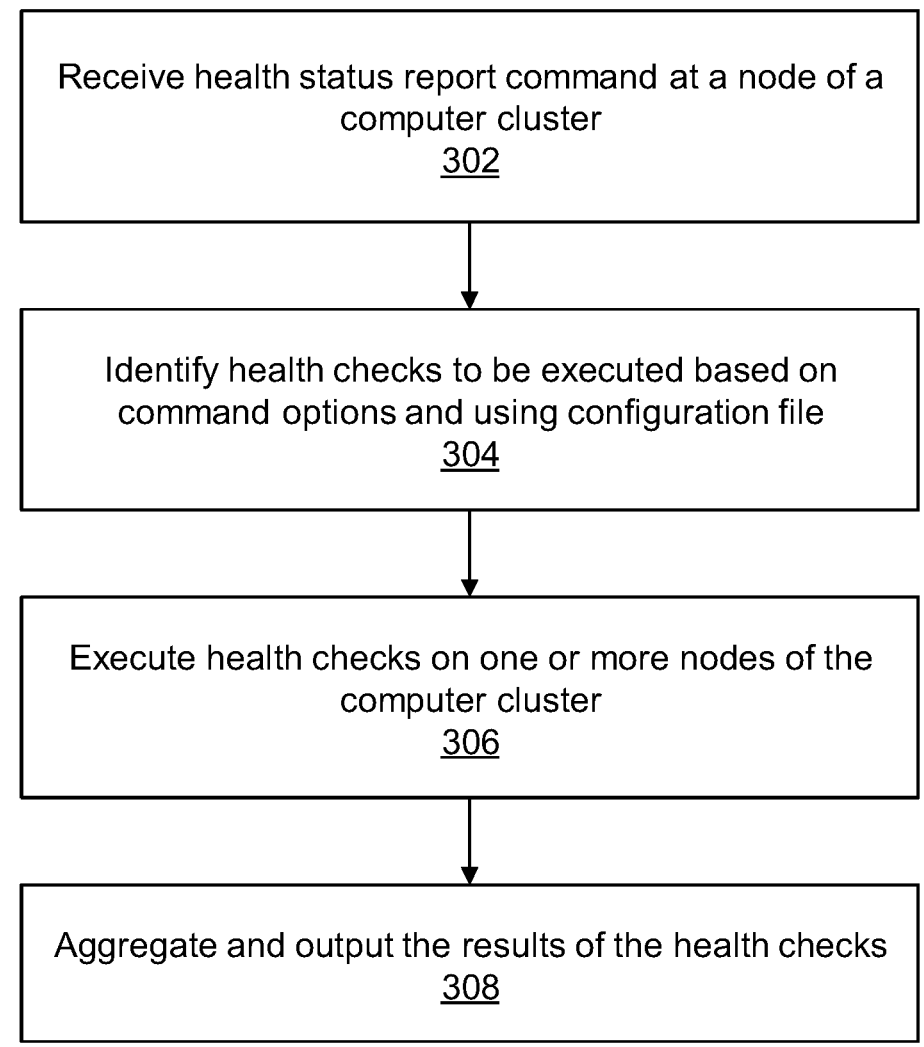
FIG. 3 is a flow diagram illustrating a process for distributed component monitoring, according to embodiments of the present disclosure.

FIG. 3 shows an illustrative a process 300 for distributed component monitoring, according to some embodiments. Process 300 may be implemented within and/or performed by a health check agent running on an individual node of a distributed system. For example, process 300 may be implemented within and/or performed by a health check agent 208 shown in FIG. 2.

At block 302, a health status command can be received by an individual node of a computer cluster (e.g., via a CLI or API). The node may include, or be associated, with various hardware and software components, including both containerized and non-container applications. The command can include one more options, such as an option specifying a class of health checks to be executed and an option specifying a scope for the health checks (e.g., component-level, node-level, cluster-level, etc.).

At block 304, one or more health checks can be identified based on command options and using a configuration file. For example, an initial list of health checks can be determined from the configuration file using the specified class. The list can then be filtered to exclude health checks that are marked as disabled within the configuration file. The health checks may be predefined (e.g., as scripts). Different health checks can be configured to detect errors, failures, or other unexpected state conditions for different hardware/software components.

At block 306, the identified health checks can be executed on one or more nodes of the cluster. These nodes can be determined based on the scope specified in the command options. If the scope specifies a cluster-level health check, the process 300 can determine the address of other nodes of the cluster and invoke the identified health checks thereon (e.g., using RPC).

At block 308, results of the executed health checks can be aggregated and provided as output. In some cases, the results can be aggregated into a report that has a text format such as XML, JSON, or plain text. The report can indicate the determined states of one or more hardware/software components across one or more nodes of the cluster. In some embodiments, process 300 can include sending the aggregated results to an analytics service external from the computer cluster.

The illustrative process 300 can include various other features of the disclosure such as any discussed above in the context FIGS. 1 and 2.

FIG. 4 shows an illustrative server device 400 that may implement various features and processes as described herein (e.g., the processing described above in the context of FIGS. 4 and 4A). The server device 400 may be implemented on any electronic device that runs software applications derived from compiled instructions, including without limitation personal computers, servers, smart phones, media players, electronic tablets, game consoles, email devices, etc. In some implementations, the server device 400 may include one or more processors 402, volatile memory 404, non-volatile memory 406, and one or more peripherals 408. These components may be interconnected by one or more computer buses 410.

Processor(s) 402 may use any known processor technology, including but not limited to graphics processors and multi-core processors. Suitable processors for the execution of a program of instructions may include, by way of example, both general and special purpose microprocessors, and the sole processor or one of multiple processors or cores, of any kind of computer. Bus 410 may be any known internal or external bus technology, including but not limited to ISA, EISA, PCI, PCI Express, NuBus, USB, Serial ATA or FireWire. Volatile memory 404 may include, for example, SDRAM. Processor 402 may receive instructions and data from a read-only memory or a random access memory or both. The essential elements of a computer may include a processor for executing instructions and one or more memories for storing instructions and data.

Non-volatile memory 406 may include by way of example semiconductor memory devices, such as EPROM, EEPROM, and flash memory devices; magnetic disks such as internal hard disks and removable disks; magneto-optical disks; and CD-ROM and DVD-ROM disks. Non-volatile memory 406 may store various computer instructions including operating system instructions 412, communication instructions 414, application instructions 416, and application data 417. Operating system instructions 412 may include instructions for implementing an operating system (e.g., Mac OS®, Windows®, or Linux). The operating system may be multi-user, multiprocessing, multitasking, multithreading, real-time, and the like. Communication instructions 414 may include network communications instructions, for example, software for implementing communication protocols, such as TCP/IP, HTTP, Ethernet, telephony, etc.

Peripherals 408 may be included within the server device 400 or operatively coupled to communicate with the server device 400. Peripherals 408 may include, for example, network interfaces 418, input devices 420, and storage devices 422. Network interfaces may include for example an Ethernet or Wi-Fi adapter. Input devices 420 may be any known input device technology, including but not limited to a keyboard (including a virtual keyboard), mouse, trackball, and touch-sensitive pad or display. Storage devices 422 may include one or more mass storage devices for storing data files; such devices include magnetic disks, such as internal hard disks and removable disks; magneto-optical disks; and optical disks.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high-level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate. The program logic may be run on a physical or virtual processor. The program logic may be run across one or more physical or virtual processors.

As used herein, the terms "processor" and "controller" are used to describe electronic circuitry that performs a function, an operation, or a sequence of operations. The function, operation, or sequence of operations can be hard coded into the electronic circuit or soft coded by way of instructions held in a memory device. The function, operation, or sequence of operations can be performed using digital values or using analog signals. In some embodiments, the processor or controller can be embodied in an application specific integrated circuit (ASIC), which can be an analog ASIC or a digital ASIC, in a microprocessor with associated program memory and/or in a discrete electronic circuit, which can be analog or digital. A processor or controller can contain internal processors or modules that perform portions of the function, operation, or sequence of operations. Similarly, a module can contain internal processors or internal modules that perform portions of the function, operation, or sequence of operations of the module.

The subject matter described herein can be implemented in digital electronic circuitry, or in computer software, firmware, or hardware, including the structural means disclosed herein and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or another unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this disclosure, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of nonvolatile memory, including by ways of example semiconductor memory devices, such as EPROM, EEPROM, flash memory device, or magnetic disks. The processor and the memory can be supplemented by, or incorporated in, special purpose logic circuitry.

In the foregoing detailed description, various features are grouped together in one or more individual embodiments for the purpose of streamlining the disclosure. This method of disclosure is not to be interpreted as reflecting an intention that each claim requires more features than are expressly recited therein. Rather, inventive aspects may lie in less than all features of each disclosed embodiment.

References in the disclosure to "one embodiment," "an embodiment," "some embodiments," or variants of such phrases indicate that the embodiment(s) described can include a particular feature, structure, or characteristic, but every embodiment can include the particular feature, structure, or characteristic. Moreover, such phrases are not necessarily referring to the same embodiment(s). Further, when a particular feature, structure, or characteristic is described in connection knowledge of one skilled in the art to affect such feature, structure, or characteristic in connection with other embodiments whether or not explicitly described.

The disclosed subject matter is not limited in its application to the details of construction and to the arrangements of the components set forth in the following description or illustrated in the drawings. The disclosed subject matter is capable of other embodiments and of being practiced and carried out in various ways. As such, those skilled in the art will appreciate that the conception, upon which this disclosure is based, may readily be utilized as a basis for the designing of other structures, methods, and systems for carrying out the several purposes of the disclosed subject matter. Therefore, the claims should be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

All publications and references cited herein are expressly incorporated herein by reference in their entirety.

The invention claimed is:

1. A method comprising:
   receiving, by a node of a computer cluster, a command for a health status report, the node having a health check agent and a plurality of applications and being one of a plurality of nodes of the cluster, the command indicating a class of a health checks to be executed and a scope;

identifying, from a configuration file, one or more health checks to be executed based on the indicated class;

executing, by the health check agent, the one or more health checks on one or more of the plurality of nodes of the cluster according to the indicated scope, the one or more health checks executed on at least one containerized application and at least one non-containerized application, where different ones of the health checks are configured to determine state of different ones of the applications;

aggregating, by the node, results of the executed health checks; and outputting the aggregated results.

2. The method of claim 1, wherein the identifying of the one or more health checks to be executed based on the indicated class includes filtering out health check indicated as disabled in the configuration.

3. The method of claim 1, wherein the executing of the one or more health checks on one or more of the applications and on one or more of the nodes of the cluster including invoking, by the node that received the health status command, the one or more health checks on another node of the computer cluster.

4. The method of claim 1, wherein the aggregating of the results of the executed health checks includes generating a plain-text report that indicates the determined states of different ones of the applications.

5. The method of claim 1, further comprising:

sending the aggregated results to an analytics service external from the computer cluster.

6. An apparatus comprising:

a processor; and a non-volatile memory storing computer program code that when executed on the processor causes the processor to execute a process including:

receiving, by a node of a computer cluster, a command for a health status report, the node having a health check agent and a plurality of applications and being one of a plurality of nodes of the cluster, the command indicating a class of a health checks to be executed and a scope;

identifying, from a configuration file, one or more health checks to be executed based on the indicated class;

executing, by the health check agent, the one or more health checks on one or more of the plurality of nodes of the cluster according to the indicated scope, the one or more health checks executed on at least one containerized application and at least one non-containerized application, where different ones of the health checks are configured to determine state of different ones of the applications;

aggregating, by the node, results of the executed health checks; and outputting the aggregated results.

7. The apparatus of claim 6, wherein the identifying of the one or more health checks to be executed based on the indicated class includes filtering out health check indicated as disabled in the configuration.

8. The apparatus of claim 6, wherein the executing of the one or more health checks on one or more of the applications and on one or more of the nodes of the cluster including invoking, by the node that received the health status command, the one or more health checks on another node of the computer cluster.

9. The apparatus of claim 6, wherein the aggregating of the results of the executed health checks includes generating a plain-text report that indicates the determined states of different ones of the applications.

10. The apparatus of claim 6, wherein the process further includes:

sending the aggregated results to an analytics service external from the computer cluster.

11. A non-transitory machine-readable medium encoding instructions that when executed by one or more processors cause a process comprising:

receiving, by a node of a computer cluster, a command for a health status report, the node having a health check agent and a plurality of applications and being one of a plurality of nodes of the cluster, the command indicating a class of a health checks to be executed and a scope;

identifying, from a configuration file, one or more health checks to be executed based on the indicated class;

executing, by the health check agent, the one or more health checks on one or more of the plurality of nodes of the cluster according to the indicated scope, the one or more health checks executed on at least one containerized application and at least one non-containerized application, where different ones of the health checks are configured to determine state of different ones of the applications;

aggregating, by the node, results of the executed health checks; and outputting the aggregated results.

12. The non-transitory machine-readable medium of claim 11, wherein the identifying of the one or more health checks to be executed based on the indicated class includes filtering out health check indicated as disabled in the configuration.

13. The non-transitory machine-readable medium of claim 11, wherein the executing of the one or more health checks on one or more of the applications and on one or more of the nodes of the cluster including invoking, by the node that received the health status command, the one or more health checks on another node of the computer cluster.

14. The non-transitory machine-readable medium of claim 11, wherein the aggregating of the results of the executed health checks includes generating a plain-text report that indicates the determined states of different ones of the applications.

15. The non-transitory machine-readable medium of claim 11, wherein the process further comprises:

sending the aggregated results to an analytics service external from the computer cluster.

* * * * *